United States Patent [19]

Skonieczny

[11] 4,058,956
[45] Nov. 22, 1977

[54] VEGETATION CLIPPING CATCHER

[76] Inventor: Wayne J. Skonieczny, 8820 S. 51st Ave., Oak Lawn, Ill. 60453

[21] Appl. No.: 655,054

[22] Filed: Feb. 4, 1976

[51] Int. Cl.² ................... A01D 75/00; A01G 3/04
[52] U.S. Cl. .......................... 56/1; 15/257.1;
  15/238; 16/87.2; 47/1 R; 47/9; 47/25; 47/32;
  126/202; 150/.5; 150/52 R; 160/351; 56/329
[58] Field of Search ............... 47/1, 9, 25, 32; 56/1,
  56/329; 52/3-5; 16/87.2; 160/330, 350, 348,
  124; 15/257.1, 238-241; 150/52 R, 1, .5; 5/344;
  224/45 R

[56] References Cited

U.S. PATENT DOCUMENTS

| 389,697 | 9/1888 | Fleming et al. | 56/329 |
| 648,760 | 5/1900 | Kolb | 160/330 |
| 1,215,126 | 2/1917 | Donnelly | 16/87.2 |
| 1,410,379 | 3/1922 | Dale | 56/329 |
| 1,484,652 | 2/1924 | Keller | 16/87.2 |
| 2,188,163 | 1/1940 | Sherman | 160/DIG. 6 |
| 2,749,695 | 6/1956 | Hoopingarner | 56/1 X |
| 2,766,797 | 10/1956 | Cowen | 150/52 R |
| 2,911,025 | 11/1959 | Paros | 150/52 R |
| 3,321,781 | 5/1967 | Reich | 4/154 |
| 3,511,039 | 5/1970 | Gould et al. | 56/329 |
| 3,535,864 | 10/1970 | Smith | 56/329 |
| 3,881,217 | 5/1975 | Bytheway, Jr. | 16/87.2 |

FOREIGN PATENT DOCUMENTS

| 1,273,144 | 7/1968 | Germany | 160/348 |

Primary Examiner—Edgar S. Burr
Assistant Examiner—Steven A. Bratlie
Attorney, Agent, or Firm—Anthony S. Zummer

[57] ABSTRACT

A vegetation clipping catcher for receiving clippings is herein disclosed. Which vegetation clipping catcher includes a support rail and a plurality of rings slideably mounted on the support rail. A rib is respectively connected to each of the slideable rings of the plurality. An apron is connected to the ribs. The apron has a central aperture formed therein. The central aperture is adapted for receipt of a stem of a shrub which is to be trimmed. A portion of the apron is formed into a flap immediately adjacent the central aperture. The flap is releasably connected to a closure portion of the apron.

4 Claims, 5 Drawing Figures

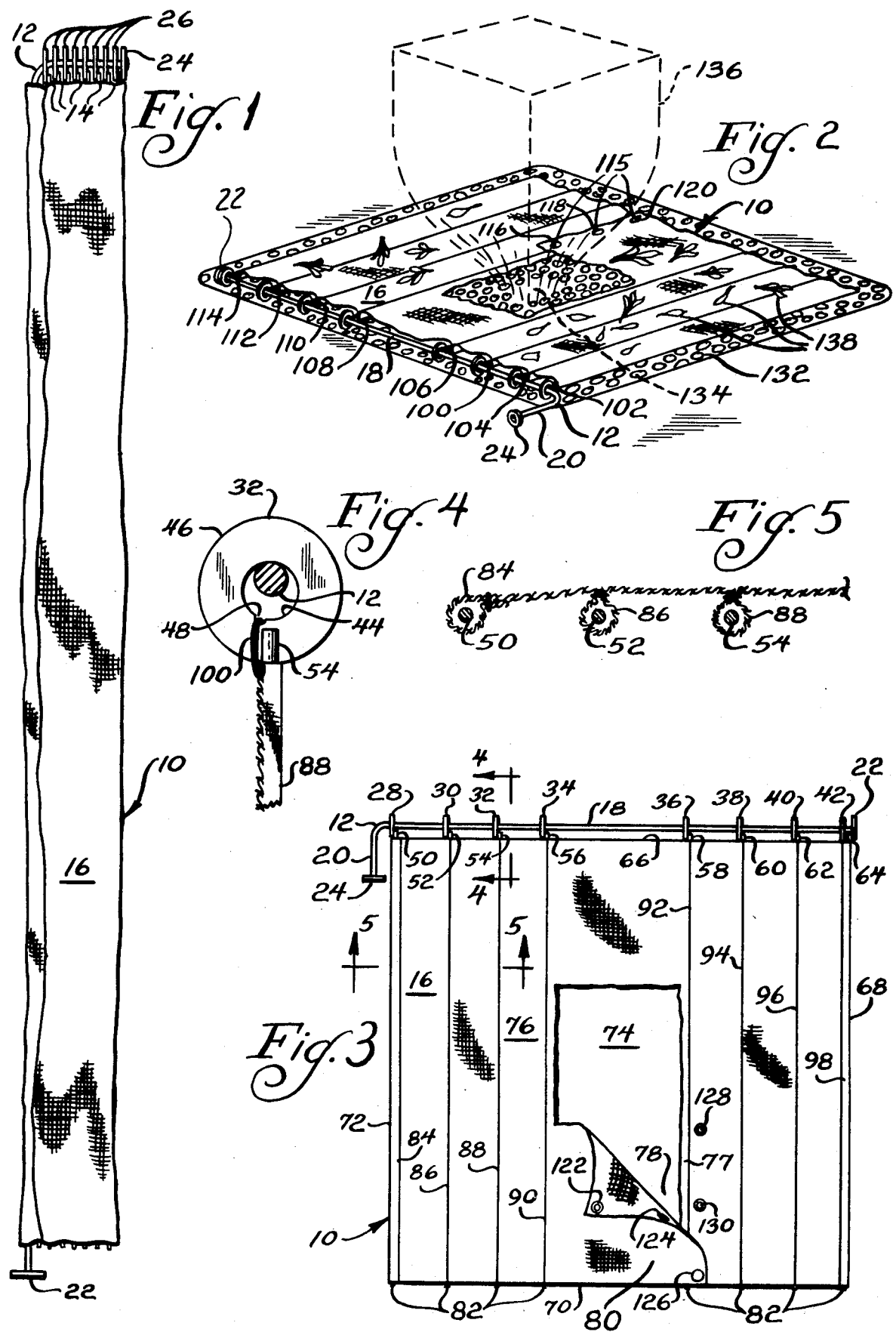

VEGETATION CLIPPING CATCHER

BACKGROUND OF THE INVENTION

Trees, bushes and, in particular, evergreens are often used in landscape architecture. When evergreens are used it is often desirable, after planting the evergreens, to place a bed of rock or pebbles underneath the evergreens and all around their trunks in order to present a pleasing appearance. The crushed rock or pebbles acts as a ground cover and reduces growth of other vegetation, such as weeds, under and around the evergreen.

It is also necessary to clip or trim the evergreens periodically in order to maintain a pleasing shape. When the evergreen is trimmed, the clippings, of course, fall to the ground. Many times the crushed rock employed as the ground cover is of a light color, often white. The evergreen clippings lying on the white stone present a displeasing appearance. There is no convenient method for removing the clippings from the crushed stone quickly and easily, without disturbing the stone.

What is needed is a portable device which can receive the evergreen clippings before the clippings land on the stones and carry the clippings away.

SUMMARY OF THE INVENTION

A vegetation clipping catcher is herein disclosed which includes a support rail having a work track and a storage neck formed integral with the work track. A plurality of rings is slideably mounted on the support rail. A plurality of ribs is connected to the plurality of rings, each rib respectively being connected to a ring. An apron is connected to the plurality of ribs. The apron is of a rectangular shape and has a rectangular central aperture formed therein. A flap is connected immediately adjacent one side of the rectangular central aperture, opposite the support rail. The flap may be opened or closed.

In operation, the vegetation clipping catcher is set up by sliding the rings onto the work track of the support rail in a spaced relationship in order to spread out the ribs, and hence, the apron. The flap is then opened and the clipping catcher is positioned underneath a bush or tree to be clipped with the central aperture being positioned around the trunk or stem of the tree or bush. The flap is then closed so that the ground is covered. The tree or bush is then trimmed in the conventional manner. After clipping is completed, the flap is reopened; the clipping catcher is removed from the tree or bush; and the clippings are removed. After use the clipping catcher may be conveniently stored by sliding the rings onto the storage neck of the support rail thus bringing the ribs close together and folding up the apron.

It is a principal object of the present invention to provide a vegetation clipping catcher which is portable and may be quickly and easily set up.

It is another object of the instant invention to provide a vegetation clipping catcher which, without disassembly, can assume a storage configuration of small space.

It is still further object of the present invention to provide a vegetation clipping catcher which may be easily and economically produced.

Other objects and uses of the instant invention will become obvious to one skilled in the art upon perusal of the specification in light of the drawings.

BRIEF DESCRIPTION OF THE DRAWINGS

FIG. 1 is a plan view of the vegetation clipping catcher with the rings positioned along the storage neck of the support rail;

FIG. 2 is a perspective view of the vegetation clipping catcher of FIG. 1, showing the rings positioned along the work track of the support rail and showing the clipping catcher positioned in operative relationship to a ground cover and a bush which is being trimmed;

FIG. 3 is a plan view of the vegetation clipping catcher of FIG. 1 in which the rings and ribs are positioned along the work track of the support rail;

FIG. 4 is a view, taken along line 4—4, of the vegetation clipping catcher of FIG. 3 having a portion broken away showing details of the ring and rib construction; and FIG. 5 is a view, taken along line 5—5, of the vegetation clipping catcher of FIG. 3 showing details of the connection of the apron to the support ribs.

DESCRIPTION OF THE PREFERRED EMBODIMENT

Referring now to the drawings and especially to FIG. 3, a vegetation clipping catcher 10 is shown therein. Vegetation clipping catcher 10 has a support rail 12. A plurality of ribs 14 is slideably mounted on support rail 12. An apron 16 is connected to plurality of ribs 14.

Support rail 12 is an elongated cane shaped member having a work track 18 and a storage neck 20 formed integral with work track 18. Storage neck 20 is formed at a right angle to work track 18. Work track 18 is slightly longer than the length of ribs 14. Storage neck 20, in this embodiment, is one-tenth the length of work track 28 to effect economies of storage space. A work stop ring 22 is connected to an end support rail 12 adjacent to work track 18. A storage stop ring 24 identical to work stop ring 22 is connected to another end of support rail 12 immediately adjacent storage neck 20.

Referring now to FIGS. 3 and 4, a plurality of rings, is generally indicated by 26. Rings 26 are slideably mounted on support rail 12. Each of rings 26 is identical to the other rings 26. Each ring of plurality of rings 26 is numbered 28, 30, 32, 34, 36, 38, 40 and 42, respectively.

Considering now, ring 32 as the typical ring of identical rings 26; ring 32 is a flattened circular ring having a central circular aperture 44 with a circular outside edge 46. A notch 48 is formed immediately adjacent circular aperture 44 to receive a string. Circular aperture 44 is of approximately twice the diameter of support rail 12. Notch 48 is considerably smaller than the diameter of support rail 12 to prevent notch 48 from inadvertently engaging support rail 12.

Each of ribs 14 is connected to a respective ring of plurality of rings 26. Each of ribs 14 is identical to the other ribs 14. Each rib of plurality of ribs 14 is numbered, respectively; 50, 52, 54, 56, 58, 60, 62 and 64. Ribs 50, 52, 54, 56, 58, 60, 62 and 64 are respectively fixed to slide rings 28, 30, 32, 34, 36, 38, 40 and 42. In the specific embodiment disclosed herein, each rib of plurality of ribs 14 is welded to its respective ring of plurality of rings 26. Each rib of plurality of ribs 14 is slightly smaller in diameter than support rail 12.

Apron 16 is, in this specific embodiment, composed of burlap. Apron 16 is of rectangular shape and has a plurality of straight edges 66, 68, 70 and 72. A central aperture 74, having a rectangular contour, is formed in apron 16. Apron 16 has a body portion 76, a closure portion 77 and a slot 78 there-between. A flap 80 extends from the body portion 76 to selectively contact closure porion 77 and close slot 78.

A plurality of sleeves 82 is positioned perpendicular to edges 66 and 70. Plurality of sleeves 82 extends from edge 66 to edge 70. Each sleeve of plurality of sleeves 82 is numbered, respectively; 84, 86, 88, 90, 92, 94, 96 and 98. Sleeves 84 and 98 are positioned immediately adjacent edges 72 and 68, respectively. Sleeves 84, 86, 88, 90, 92, 94, 96 and 98 receive, respectively, ribs 50, 52, 54, 56, 58, 60, 62 and 64. Ribs 14 are positioned flush with edge 70. Ribs 14 extend a short distance out of sleeves 82 at edge 66 to connect to rings 26.

Referring now to FIG. 4, it may be seen that a string loop 100 holds sleeve 88 to rib 54 and slide ring 32. String loop 100 is positioned within notch 48 to prevent string loop 100 from wearing along the outside edge 46 of aperture 44. In a similar fashion, a plurality of strings numbered 102, 104, 106, 108, 110, 112 and 114, respectively; holds sleeves 84, 86, 90, 92, 94, 96 and 98 to slide rings 28, 30, 34, 36, 38, 40 and 42. Strings 102 through 114 likewise engage their respective notches in slip rings 28, 30, 34, 36, 38, 40 and 42.

Slot 78 of apron 16 has approximately the same width as central aperture 74. Slot 78 may be closed by folding flap 80 into a closed position in contact with closure portion 77. A plurality of snaps 115 is connected to apron 16. Each snap of plurality of snaps 115 is respectively numbered 116, 118 and 120. Snaps 116, 118 and 120 have respective female portions 122, 124 and 126. Female portions 122, 124 and 126 are connected to flap 80. Snaps 116, 118 and 120 have respective male portions which are numbered 128 and 130. The male portions of snaps 116, 118 and 120 are connected to closure portion 80.

Referring now to FIG. 1, the storage configuration of vegetation clipping catcher 10 is shown therein. Rings 26 are all positioned along storage neck 20 of support rail 12. Thus giving a compact configuration to vegetation clipping catcher 10.

When vegetation clipping catcher 10 is used, slip rings 26 are slid in spaced relationship, onto work track 18 of support rail 12. Flap 80 is then folded back onto body portion 76 of apron 16 thereby exposing slot 78. Vegetation clipping catcher 10 is then moved over a ground cover 132, in this embodiment crushed white stone. Vegetation clipping catcher 10 is guided so that slot 78 and central aperture 74 are positioned around a stem 134 of a shrub 136, which is to be trimmed. Apron 16 then covers the ground cover 132 immediately around shrub 136. Flap 80 is next folded across slot 78 into contact with closure portion 77 and snaps 116, 118 and 120 are closed, thereby covering slot 78 completely and only allowing central aperture 74 to expose ground cover 132. Ribs 14 give apron 16 support whle being able to conform to the contours of ground cover 132. Shrub 136 is then trimmed or clipped in a conventional manner, and a plurality of clippings 138, instead of falling onto ground cover 132 and becoming entangled therewith, fall on apron 16. After trimming of shrub 132 is completed, snaps 116, 118 and 120 are opened, together with flap 80; and vegetation clipping catcher 10 is removed from underneath shrub 132. Clippings 138 are then transferred to a suitable container and vegetation clipping catcher 10 is ready to be used again.

After all the shrubs have been clipped, vegetation clipping catcher 10 can be stored away. Slide rings 28, 30, 32, 34, 36, 38, 40 and 42 are then slid onto storage neck 20 of support rail 12 and apron 16 is folded up. Thus, the space which vegetation clipping catcher 10 uses is substantially diminished while allowing vegetation clipping catcher 10 to remain completely assembled and ready for use in a short time. Clipping catcher 10 is stored in the configuration shown in FIG. 1 with work track 18 of support rail 12 being positioned parallel to ribs 50, 52, 54, 56, 58, 60, 62 and 64. Stop rings 22 and 24 prevent plurality of rings 26 from falling off support rail 12.

It may be appreciated that vegetation clipping catcher 10 provides a quick and convenient method for preventing clippings from becoming entangled in ground cover without disturbing the ground cover.

It may also be appreciated that vegetation clipping catcher 10 may be quickly and easily stored in a relatively small space without the necessity of disassembling any portions of clipping catcher 10.

It may also be appreciated that vegetation clipping catcher 10 may be constructed from inexpensive material.

Although the specific disclosure shown and described above sets forth a vegetation clipping catcher having a burlap apron, it is readily apparent that other materials such as canvas or nylon may also be used. Furthermore, the ribs can be fixed to the slide rings by brazing or riveting as well as by welding. All of these modifications are readily apparent to one skilled in the art.

Although a specific embodiment of the herein disclosed invention has been described in detail above, it may be appreciated that those skilled in the art may make other modifications and changes in the specific vegetation clipping catcher disclosed above without departing from the spirit and scope of the present invention. It is to be expressly understood that the instant invention is limited only by the appended claims.

What is claimed is:

1. A vegetation clipping catcher comprising: a support rail, said support rail having a work track and a storage neck formed integral with and substantially perpendicular to said work track; a plurality of ribs each slideably connected to said support rail by a slideable ring, said plurality of ribs being adapted to be positioned in a stored attitude on said storage neck substantially parallel to said work track; and an apron connected to said plurality of ribs, said apron having a slot and a flap positioned adjacent said slot, said apron slot being adapted to receive a stem of a shrub to be trimmed, said apron also being adapted to cover a ground cover surrounding said shrub to receive a plurality of clippings of said shrub, said ribs extending from one edge of the apron adjacent to the support rail to the opposite edge of the apron for supporting said apron, and a plurality of loops each holding said apron to each said ring in proximity with said support rail.

2. A vegetation clipping catcher as defined in claim 1 in which each rib of said plurality of ribs is of substantially the same length as other ribs of said plurality of ribs.

3. A vegetation clipping catcher as defined in claim 1 in which said apron is a flexible apron.

4. A vegetation clipping catcher comprising: a support rail, said support rail having a long work track and a short storage neck, said short storage neck being formed integral with and perpendicular to said long work track; a first stop connected to said long work track, a second stop connected to said short storage neck; a plurality of rings slideably mounted on said support rail, each slideable ring of said plurality of slideable rings having an aperture and a notch formed contiguous with said aperture, said plurality of slideable rings being limited in travel along said support rail by said first and second stops; a rib connected to each of said slideable rings, each rib being identical to said other ribs; and a flexible apron receiving said ribs in a plurality of parallel sleeves, said flexible apron having a string loop passing through each of said notches of said slideable rings, each string loop being supportively connected to a respective sleeve of said plurality of sleeves, said flexible apron having an aperture and a slot formed therein, said aperture and said slot being adapted to receive a stem of a shrub to be trimmed; and a flap formed integral with said flexible apron, said flap having a plurality of fasteners connected thereto, said fasteners being adapted to hold said flap closed over said slot.

* * * * *

UNITED STATES PATENT OFFICE
CERTIFICATE OF CORRECTION

PATENT NO. : 4,058,956
DATED : November 22, 1977
INVENTOR(S) : Wayne J. Skonieczny It is certified that error appears in the above-identified patent and that said Letters Patent are hereby corrected as shown below:

Column 2, Line 35, "28" should be --18--.

Column 2, Line 36, after "end", insert --of--.

Column 3, Line 4, "porion" should be --portion--.

Column 3, Line 56, "whle" should be --while--.

Signed and Sealed this

Twenty-eighth Day of February 1978

[SEAL]

Attest:

RUTH C. MASON
Attesting Officer

LUTRELLE F. PARKER
Acting Commissioner of Patents and Trademarks